(12) United States Patent
Furuta (10) Patent No.: US 11,574,396 B2
(45) Date of Patent: Feb. 7, 2023

(54) INSPECTION METHOD OF EXAMINATION SYSTEM AND EXAMINATION SYSTEM

(71) Applicant: NHK SPRING CO., LTD., Yokohama (JP)

(72) Inventor: Eijiro Furuta, Yokohama (JP)

(73) Assignee: NHK SPRING CO., LTD., Kanagawa (JP)

( * ) Notice: Subject to any disclaimer, the term of this patent is extended or adjusted under 35 U.S.C. 154(b) by 27 days.

(21) Appl. No.: 17/187,586

(22) Filed: Feb. 26, 2021

(65) Prior Publication Data

US 2021/0279856 A1    Sep. 9, 2021

(30) Foreign Application Priority Data

Mar. 4, 2020 (JP) .............................. JP2020-036996

(51) Int. Cl.
*G06T 7/00* (2017.01)

(52) U.S. Cl.
CPC .. *G06T 7/0004* (2013.01); *G06T 2207/30164* (2013.01); *G06T 2207/30168* (2013.01)

(58) Field of Classification Search
CPC ......... G06T 7/0004; G06T 2207/30164; G06T 2207/30168; G06V 20/49; G06V 20/44; H04N 19/87; H04N 7/185
USPC ................................................. 348/187, 189
See application file for complete search history.

(56) References Cited

U.S. PATENT DOCUMENTS

| | | | |
|---|---|---|---|
| 5,532,765 A * | 7/1996 | Inoue ..................... | H04N 9/317 348/E17.005 |
| 5,561,459 A * | 10/1996 | Stokes ..................... | G09G 5/02 348/184 |
| 5,918,192 A * | 6/1999 | Tomaszewski ...... | H04N 17/002 348/333.01 |
| 6,285,349 B1 * | 9/2001 | Smith ................... | H04N 9/3185 348/E5.073 |
| 6,630,938 B1 * | 10/2003 | Nanni ..................... | G09G 5/003 348/E17.005 |
| 7,733,404 B2 * | 6/2010 | Zandifar ............... | G09G 3/2092 348/333.01 |
| 7,775,714 B2 * | 8/2010 | Crucs ..................... | G01D 18/00 378/207 |
| 8,836,796 B2 * | 9/2014 | Dickins .................. | H04N 17/04 349/190 |

(Continued)

FOREIGN PATENT DOCUMENTS

| | | | | |
|---|---|---|---|---|
| DE | 102020122666 A1 * | 3/2021 | ............ | G01B 11/14 |
| EP | 3974284 A1 * | 3/2022 | | |

(Continued)

OTHER PUBLICATIONS

Sheng-Jen Hsieh, C. E. Rash, T. H. Harding, H. H. Beasley and J. S. Martin, "Helmet-mounted display image quality evaluation system," in IEEE Transactions on Instrumentation and Measurement, vol. 52, No. 6, pp. 1838-1845, Dec. 2003, doi: 10.1109/TIM.2003.820497. (Year: 2003).*

(Continued)

*Primary Examiner* — Michael Robert Cammarata
(74) *Attorney, Agent, or Firm* — Holtz, Holtz & Volek PC (57) ABSTRACT

An inspection method to be used to inspect an examination system configured to image an object and make a good/defective determination of the object on the basis of an image acquired by the imaging comprises displaying a sample image of the object, imaging the displayed sample image by a camera, and making a good/defective determination of the object indicated by the sample image on, the basis of the image acquired by imaging of the camera.

8 Claims, 5 Drawing Sheets

(56) References Cited

U.S. PATENT DOCUMENTS

| | | | | |
|---|---|---|---|---|
| 2005/0035311 | A1* | 2/2005 | Asakawa | G01N 21/95 250/559.16 |
| 2007/0091201 | A1* | 4/2007 | Sasaki | G03B 37/04 348/E5.037 |
| 2012/0194666 | A1* | 8/2012 | Jackson | G01C 23/00 348/123 |
| 2019/0005607 | A1* | 1/2019 | Tamai | H04N 9/3185 |
| 2019/0125449 | A1* | 5/2019 | Wollowick | A61B 6/563 |
| 2019/0268590 | A1* | 8/2019 | Kato | G06T 7/001 |
| 2020/0273156 | A1* | 8/2020 | Lei | G06T 7/001 |
| 2020/0371736 | A1* | 11/2020 | Iversen | G06F 3/1446 |
| 2021/0142459 | A1* | 5/2021 | Ito | G06T 7/001 |

FOREIGN PATENT DOCUMENTS

| | | | | |
|---|---|---|---|---|
| ES | 2819699 T3 * | 4/2021 | | G06F 11/00 |
| JP | 2000180138 A | 6/2000 | | |
| JP | 2004239834 A * | 8/2004 | | |
| JP | 2007033280 A * | 2/2007 | | |
| JP | 2007071715 A * | 3/2007 | | |
| WO | WO-03007237 A1 * | 1/2003 | | G06T 1/0007 |

OTHER PUBLICATIONS

Z. Fan, S. Zhang, Y. Weng, G. Chen and H. Liao, "3D Quantitative Evaluation System for Autostereoscopic Display," in Journal of Display Technology, vol. 12, No. 10, pp. 1185-1196, Oct. 2016, doi: 10.1109/JDT.2016.2569452 (Year: 2016).*

M. Fiala, "Automatic Projector Calibration Using Self-Identifying Patterns," 2005 IEEE Computer Society Conference on Computer Vision and Pattern Recognition (CVPR'05)—Workshops, 2005, pp. 113-113, doi: 10.1109/CVPR.2005.416. (Year: 2005).*

A. A. R. M. A. Ebayyeh and A. Mousavi, "A Review and Analysis of Automatic Optical Inspection and Quality Monitoring Methods in Electronics Industry," in IEEE Access, vol. 8, pp. 183192-183271, 2020, doi: 10.1109/ACCESS.2020.3029127. (Year: 2020).*

* cited by examiner

INSPECTION METHOD OF EXAMINATION SYSTEM AND EXAMINATION SYSTEM

CROSS-REFERENCE TO RELATED APPLICATIONS

This application is based upon and claims the benefit of priority from prior Japanese Patent Application No. 2020-036996, filed Mar. 4, 2020, the entire contents of which are incorporated herein by reference.

BACKGROUND OF THE INVENTION

1. Field of the Invention

The present invention relates to an inspection method of an examination system used for image inspection and examination system.

2. Description of the Related Art

In an inspection process of a product, the product is imaged by using an imaging means such as a camera or the like, and an image inspection for a good/defective determination of the product is carried out on the basis of the imaged image data. In the image inspection, the good/defective determination is made by comparing, for example, image data of a good product prepared in advance and image data obtained by imaging the product which is an object to be inspected with each other. At this time, the image data obtained by imaging the product which is the object to be tested is not only compared with the image data of the good product but also with image data of a defective product in some cases.

In the good/defective determination based on the image inspection, a determination not only using the external appearance and shape as a criterion but also using the color and light/shade as a criterion is also made. Various algorithms for image processing are used in these determinations. In the examination system for image inspection, an image sensor or the like such as a camera or the like is used, and hence calibration of the dimension or color is carried out as the need arises (for example, JP 2000-180138 A).

As a method of inspecting whether or not the examination system for image inspection is normal, there is a method of inspecting the examination system by using, for example, a master sample of a good product or defective product. In this case, whether or not the image inspection is normal is inspected by imaging the master sample. However, in the case of a master sample to be used for good/defective determination of an oxidation situation, even when the storage condition is good, there is a possibility of discoloration (tarnishing) occurring concomitantly with the progress in oxidation, and such a sample cannot withstand long use as a master sample.

Further, it is possible to carry out calibration of a camera of an examination system by using a commercially available general-purpose master such as a color master or dimension master. However, the calibration using the commercially available general-purpose master is an inspection using a substitute which is not the object of the examination system, and it is not possible for the above-mentioned calibration and inspection using a substitute to inspect whether or not the good/defective determination of a product made by the actual examination system is normal.

As another inspection method, there is also a method of inspecting whether or not a good/defective determination made by an examination system is normal by using images of a good product and defective product instead of using master samples of a good product and defective product. However, when images of a good product and defective product are used, it is not possible to inspect whether or not the examination system including imaging by using a camera is normal. Accordingly, it has been required that an inspection method for confirming whether or not an examination system including a camera is normal without using master samples of a good product and defective product be established.

As described above, there is yet room for various improvements in the conventional, inspection method of the examination system to be used for image inspection.

BRIEF SUMMARY OF THE INVENTION

The present invention makes it one of the objects thereof to provide an inspection method making it possible to inspect an examination system used for image inspection with a high degree of accuracy, and examination system.

According to an embodiment, an inspection method to be used to inspect an examination system configured to image an object and make a good/defective determination of the object on the basis of an image acquired by the imaging comprises: displaying a sample image of the object; imaging the displayed sample image by a camera; and making a good/defective determination of the object indicated by the sample image on the basis of the image acquired by imaging of the camera.

The sample image may be displayed in the actual size of the object. The making a good/defective determination of the object indicated by the sample image may include comparing the image acquired by imaging of the camera and the sample image with each other. The inspection method may include making a good/defective determination of the object indicated by the sample image and thereafter outputting a result of the determination.

According to an embodiment, an examination system configured to image an object and make a good/defective determination of the object on the basis of an image acquired by the imaging comprises a display device configured to display an image, an imaging device including a camera configured to image the object, and a control device configured to control the display device and the imaging device, wherein the control device makes the display device display a sample image of the object, makes the camera image the sample image displayed on the display device, and makes a good/defective determination of the object indicated by the sample image on the basis of the image acquired by imaging of the camera.

The display device may display the sample image in the actual size of the object. The control device may make the good/defective determination of the object indicated by the sample image by comparing the image acquired by imaging of the camera and the sample image with each other. The examination system may further comprise an output device configured to output a result of the good/defective determination of the object indicated by the sample image.

According to the present invention, an inspection method making it possible to inspect an examination system used for image inspection with a high degree of accuracy, and examination system will be achieved.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

Some embodiments of the present invention will be described below with reference to the accompanying drawings.

First Embodiment

As an examination system according to this embodiment, an examination system applicable to an inspection of a tip section of a disk-device suspension is exemplified. The examination system is applicable not only to an inspection of the tip section of the suspension but also to an examination system for image inspection of other products. In the drawings, there is sometimes a case where the relative sizes and positions of the members constituting the examination system are schematically shown. It should be noted that the present invention is not limited by the embodiments to be described hereinafter.

Figure 1:
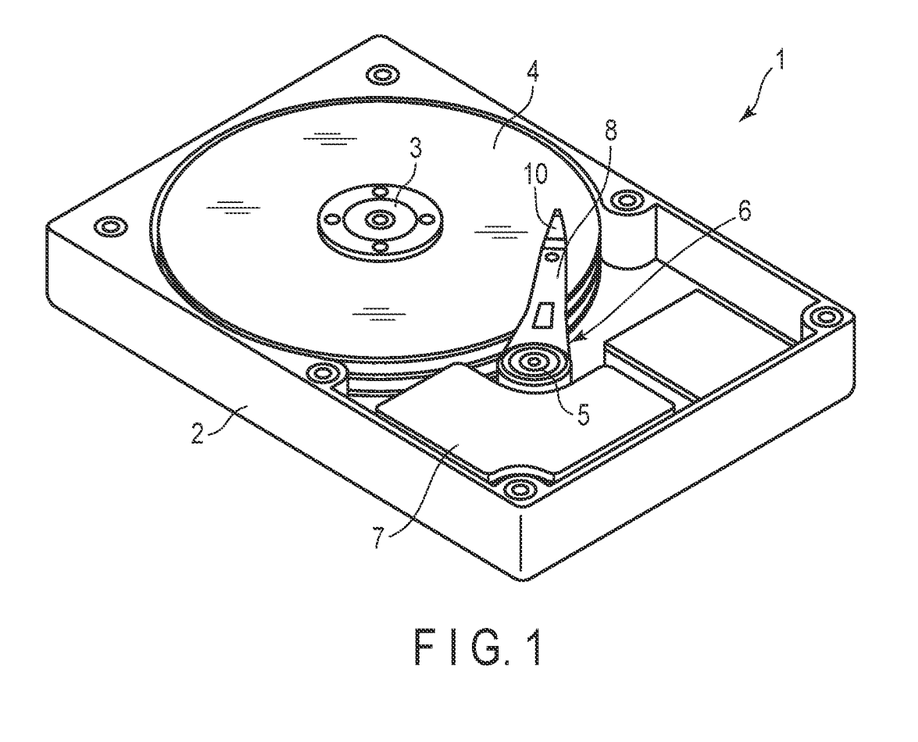
FIG. 1 is a schematic perspective view showing an example of a disk device.

FIG. 1 is a schematic perspective view showing an example of a disk device 1. As shown in FIG. 1, the disk device (HDD) 1 is provided with a case 2, a plurality of disks 4 to be rotated around a spindle 3, carriage 6 which can be turned around a pivot shaft 5, and positioning motor (voice coil motor) 7 for driving the carriage 6. The case 2 is tightly closed with a lid not shown.

Figure 2:
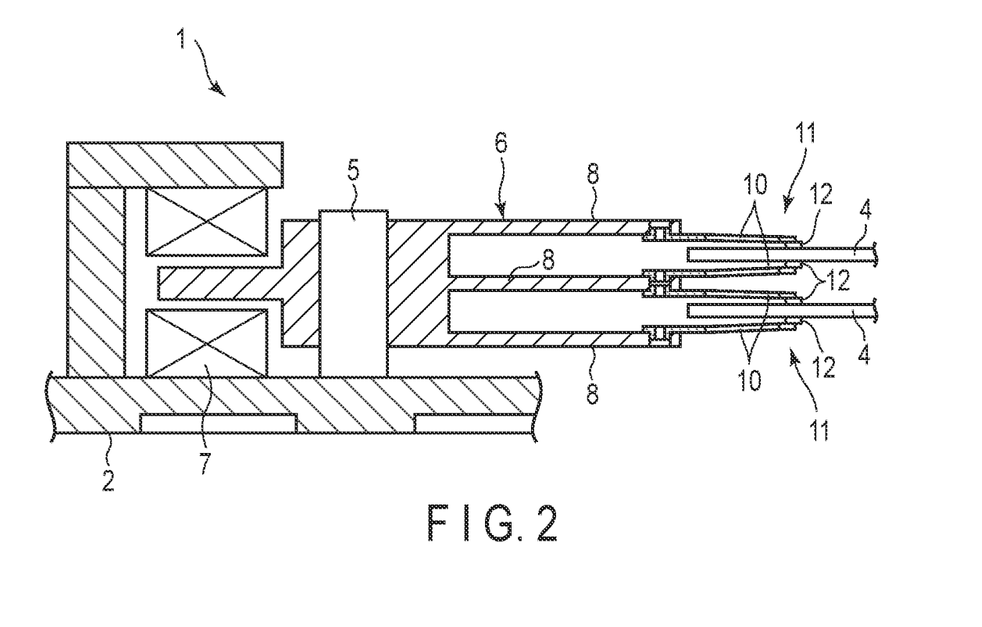
FIG. 2 is a schematic cross-sectional view showing part of the disk device.

FIG. 2 is a schematic cross-sectional view showing part of the disk device 1. The carriage 6 is provided with arms 8. A suspension 10 or suspensions 10 is or are attached to a tip section of each of the arms 8. A slider 12 constituting a magnetic head is mounted on a tip section 11 of the suspension 10. When the disk 4 is rotated at a high rotational speed, air is made to flow into a gap between the disk 4 and slider 12, whereby an air bearing is formed.

When the carriage 6 is turned by the voice coil motor 7, the suspension 10 is moved in the radial direction of the disk 4, whereby the slider 12 is moved to a desired track of the disk 4. Further, with the high densification of magnetic recording, an actuator using a piezoelectric element is mounted on the suspension 10 in some cases. The actuator is mounted on a tongue section formed at a tip of, for example, a flexure.

Figure 3:
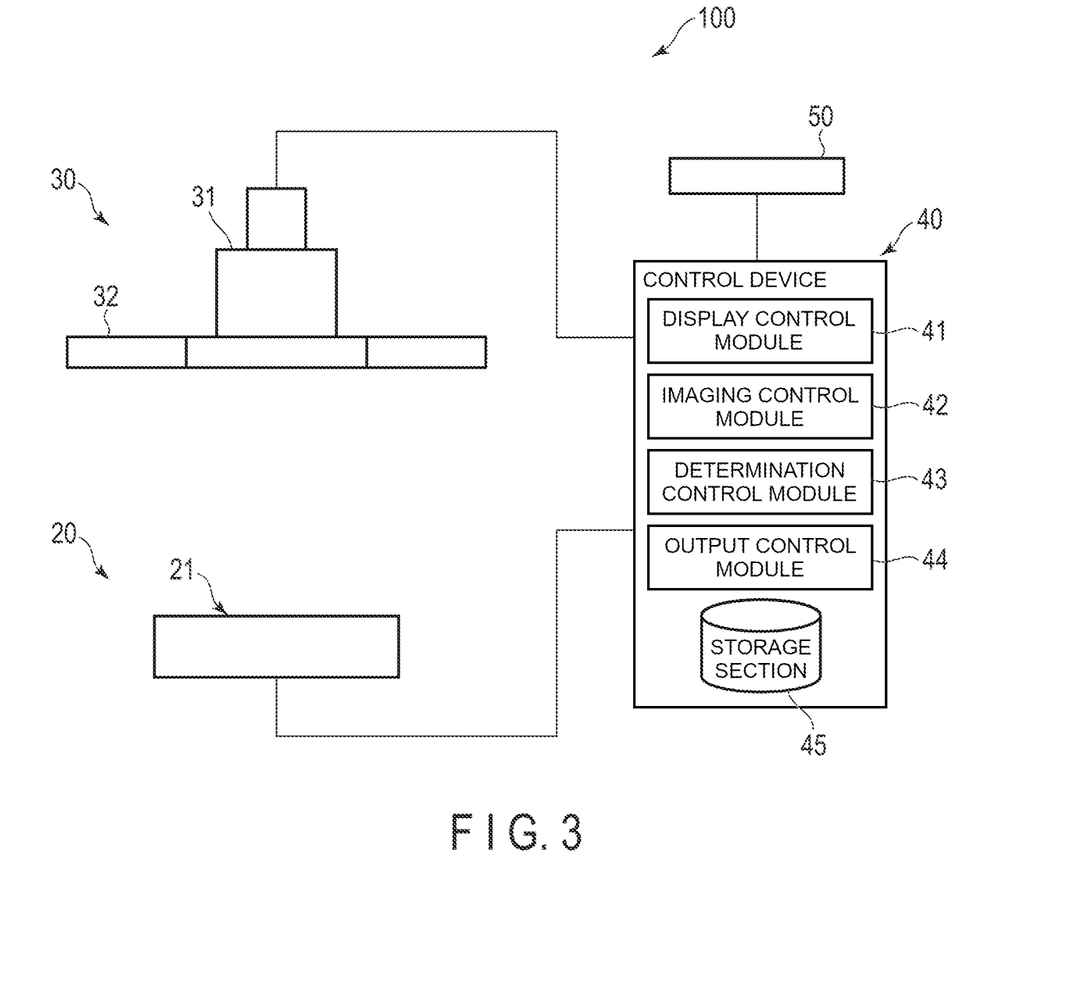
FIG. 3 is a view showing the schematic configuration of an examination system according to a first embodiment.

FIG. 3 is a view showing the schematic configuration of an examination system 100 according to the first embodiment. The examination system 100 is used for, for example, image inspection of the tip section 11 of the suspension 10. The examination system 100 according to this embodiment can be used for image inspection of not only the tip section 11 of the suspension 10 but also the other products.

The examination system 100 is provided with a display device 20, imaging device 30, control device 40, and output device 50. Each of the display device 20, imaging device 30, and output device 50 is communicably connected to the control device 40. The control device 40 is configured to be able to control each of the display device 20, imaging device 30, and output device 50.

The display device 20 is provided with a monitor 21 for displaying an image. On the monitor 21, a sample image of an object is displayed. The sample image implies an image of an object which is a good article or defective article prepared in advance. A sample image of a good article is an image obtained by imaging the object which is a good article by means of, for example, a camera 31 to be described later. Further, a sample image of a defective article is an image obtained by imaging the object which is a defective article by means of, for example, the camera 31 to be described later. The sample images of a good article and defective article may be images acquired by imaging of a camera different from the camera 31 to be described later. On the monitor 21, one sample image may be displayed or two or more sample images may be displayed at a time. Further, the sample image is displayed on the monitor 21 in an actual size of the object. When an image inspection of the object is carried out, the object is arranged at the position at which the monitor 21 is placed.

The imaging device 30 is provided with a camera 31 and light source 32. The camera 31 images the object, whereby an image for image inspection is acquired. Further, at the time of inspection of the examination system 100, the camera 31 images a sample image displayed on the monitor 21. The camera 31 is placed in a state where the camera 31 can image the object. The light source 32 is placed in a state where the light source 32 can irradiate the object for the purpose of imaging the object by means of the camera 31. The camera 31 is, for example, a CMOS camera, CCD camera or the like. The light source 32 is, for example, an LED illuminator or the like.

The control device 40 includes a display control module 41, imaging control module 42, determination control module 43, output control module 44, and storage section 45. The display control module 41 controls the display device 20 to thereby make the monitor 21 display thereon a sample image of the object stored in the storage section 45.

In the image inspection of the object, the imaging control module 42 controls the imaging device 30 to thereby make the camera 31 image the object. At the time of inspection of the examination system 100, the imaging control module 42 controls the imaging device 30 to thereby make the camera 31 image a sample image displayed on the monitor 21.

The determination control module 43 makes, on the basis of an image acquired by imaging of the camera 31, a good/defective determination of the object indicated by the image. The determination control module 43 may further determine whether or not the examination system 100 is normal on the basis of the above good/defective determination result. The output control module 44 controls the output device 50 to thereby make the output device 50 output the determination result obtained by the determination control module 43.

In the storage section 45, various data items are stored. The storage section 45 is, for example, a hard disk drive (HDD), flash memory or the like. Data to be stored in the storage section 45 is images acquired by imaging of the camera 31, sample images of the objects which are good articles and objects which are defective articles to be displayed on the monitor 21, various programs for realizing control in the control modules, and various data items which are setting conditions necessary for various processing items such as specifications or the like of the examination system 100, object, and camera 31.

The output device 50 outputs the determination result obtained by the determination control module 43. As the output device 50, for example, a monitor for displaying the determination result, speaker for phonically outputting the determination result, light-emitting device for emitting light according to the determination result, communication unit or the like for transmitting the determination result to other devices through a network can be used. The output device 50 may include two or more of these monitor, speaker, light-emitting device, and communication unit.

The examination system 100 may also be defined as a system including elements other than the constituent elements shown in FIG. 3. Further, the examination system 100 may be configured as an independent system or may be incorporated in the other system as part of the system.

Figure 4A:
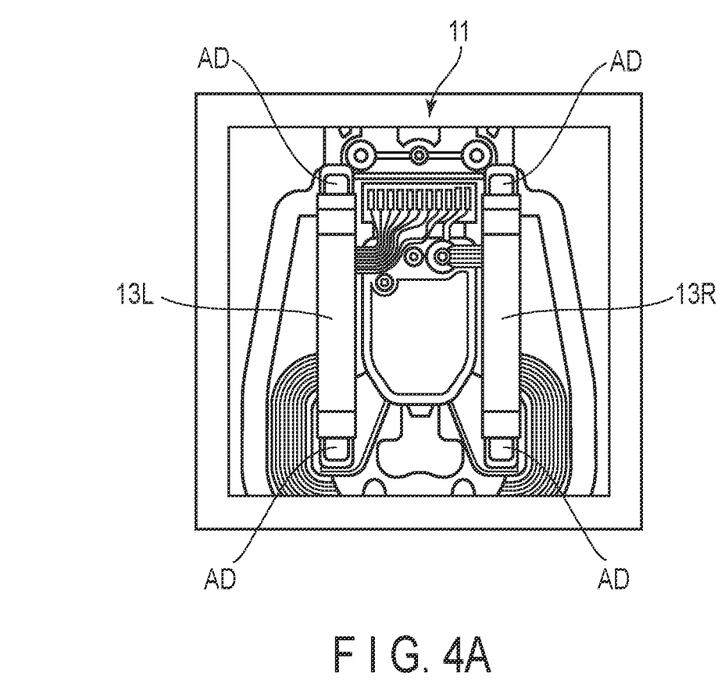
FIG. 4A shows a view showing an example of an image of an object imaged by a camera.
Figure 4B:
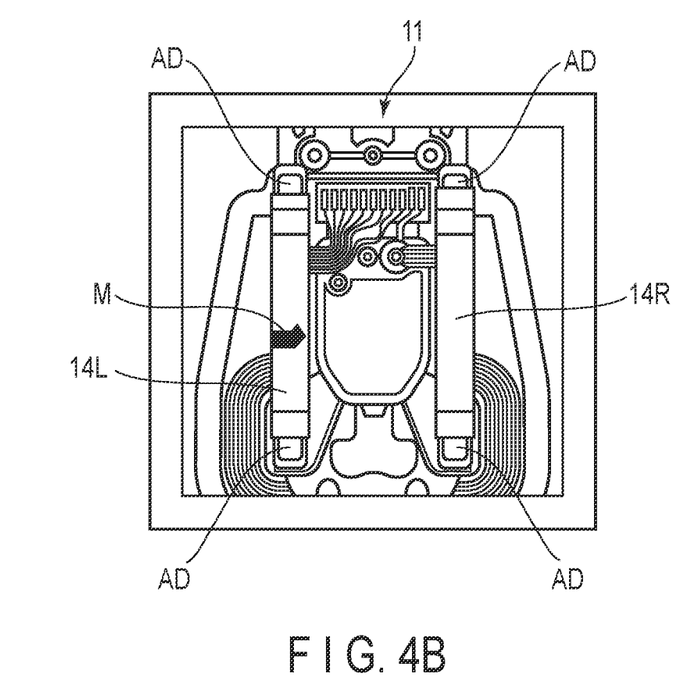
FIG. 4B shows a view showing an example of an image of an object imaged by a camera.

FIG. 4A and FIG. 4B show views each showing an example of an image of the object imaged by the camera 31. In each of the examples shown in FIG. 4A and FIG. 4B, the tip section 11 of the suspension 10 is shown. The object of the examination system 100 is not limited to the tip section 11 of the suspension 10.

On the object indicated by the image acquired by imaging of the camera 31, a pair of actuators is mounted, and each of these actuators is fixed with an adhesive. FIG. 4A is an image of the object which is a good article. FIG. 4B is an image of the object which is a defective article. The tip section 11 indicated by the image of FIG. 4A includes a pair of actuators 13R and 13L. Each of the pair of actuators 13R and 13L is connected to the tip section 11 through the adhesive AD at both ends thereof. The actuator 13 is provided with a piezoelectric element constituted of a piezoelectric body such as lead zirconate titanate (PZT) or the like and electrode provided on the surface of the piezoelectric element. The adhesive AD is a conductive paste such as a silver paste or the like.

The tip section 11 indicated by the image of FIG. 4B includes a pair of actuators 14R and 14L. Each of the pair of actuators 14R and 14L is, as in the case of FIG. 4A, connected to the tip section 11 through the adhesive AD at both ends thereof. However, of the pair of actuators 14, the actuator 14L has a mark M on the outer surface thereof. The mark M is a mark for indicating that the actuator is a rejected article. That is, on the tip section 11 indicated by the image of FIG. 4B, the actuator 14R which is an accepted article and actuator 14L which is a rejected article are mounted.

It should be noted that the object which is a rejected article is not limited to an article having the mark M thereon as exemplified in FIG. 4B. In addition to the above rejected article, various objects which are the elements included in the tip section 11 not satisfying the predetermined requirements in outer shape, color, light/shade and the like can be rejected articles.

Image inspection of the object to be carried out in the examination system 100 is carried out by comparing the image of the object acquired by imaging of, for example, the camera 31 and sample image of the object which is a good article or defective article with each other. The sample image of the object which is a good article or defective article may be prepared in advance and may be stored in the storage section 45 of the control device 40. The examination system 100 compares the image acquired by imaging of the camera 31 and sample image of the object which is a good article with each other with regard to the items of, for example, the outer shape, color, light/shade and the like and, when a point deviating from the inspection criterion is detected, determines that the object is a defective article.

Regarding the tip section 11 of the suspension 10 in the example shown in FIG. 4A and FIG. 4B, it is possible for the examination system 100 to detect whether or not the actuator is correctly mounted on the tip section 11 by comparing, for example, the outer shapes of the actuator and elements around the actuator with each other. Further, it is possible for the examination system 100 to detect whether or not the actuator has a crack, chipping or the above-mentioned mark M by comparing the actuator and elements around the actuator with each other with regard to light/shade and color. The items to be detected in the image inspection are not limited to the above.

Further, it is possible not only to carry out examination of the actuator of the tip section 11 but also to carry out examination as to whether or not the adhesive AD is normally applied. The examination system 100 detects presence/absence of the adhesive AD, position at which the adhesive AD is applied, range in which the adhesive AD is applied, and the like from the image acquired by imaging of the camera 31 on the basis of light/shade and the like, and compares these detected items with the sample image, whereby it is possible for the examination system 100 to examine whether or not the adhesive AD is normally applied.

Figure 5:
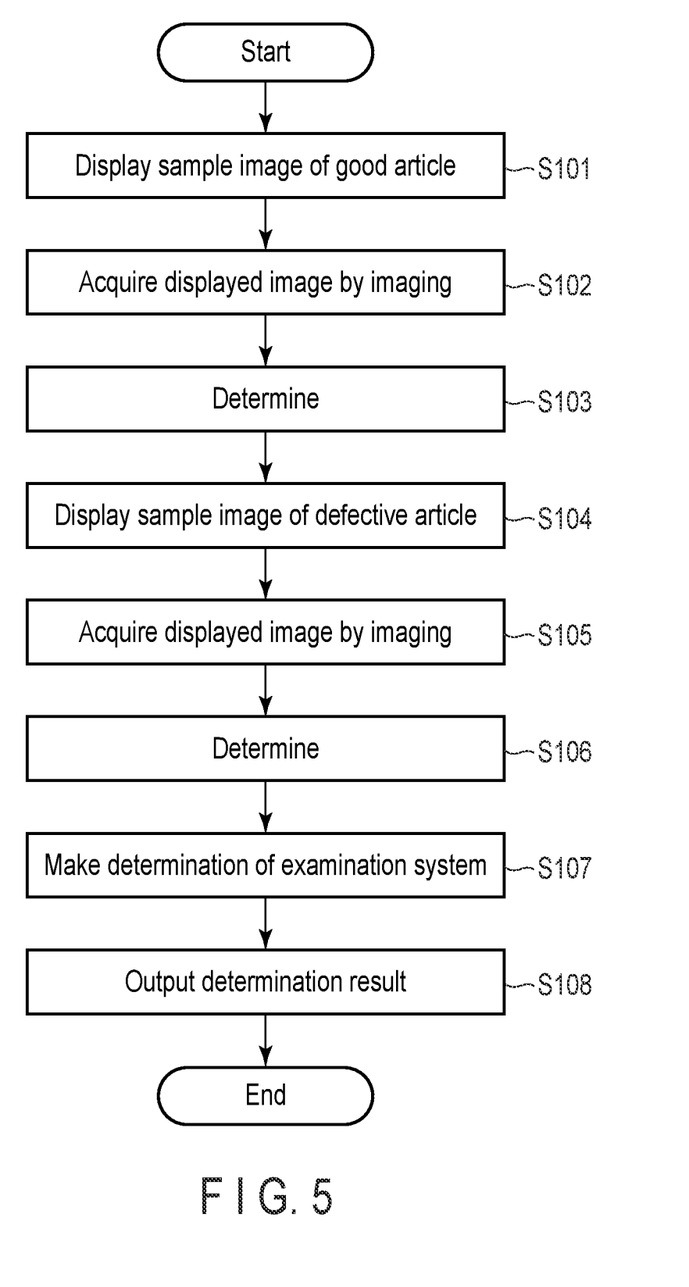
FIG. 5 is a flowchart showing an example of an operation of the examination system according to the first embodiment.

FIG. 5 is a flowchart showing an example of an operation of the examination system 100 according to the first embodiment. The operations shown in the flowchart are applied to, of the operations of the examination system 100, an inspection method for inspecting the examination system 100. The inspection method for inspecting the examination system 100 is executed before an image inspection of the object is carried out in the examination system 100 in some cases, and is executed at the time of maintenance of the examination system 100 in some cases. The inspection of the examination system 100 using the above inspection method is to be executed on a daily basis.

The operations shown in the flowchart is executed by the control device 40. The control device 40 includes a computer constituted of a processor, memory, and the like. For example, the processor provided in the control device 40 executes the computer program stored in the storage section 45, whereby the aforementioned display control module 41, imaging control module 42, determination control module 43, and output control module 44 are realized. Execution of the computer program may be realized by using a plurality of processors. At least one of the modules 41 to 44 may be a separate device independent of the control device 40.

First, prior to starting the operation for inspecting the examination system 100, the worker places the display device 20 at a position at which the object is to be arranged as shown in FIG. 3. Further, the display device 20 may also be automatically arranged by the control device 40. At this time, it is not necessary to change the devices and the like of the examination system 100 other than the display device 20.

Then, when the operation for inspecting the examination system 100 is started, the display control module 41 displays the sample image of the good article stored in the storage section 45 on the monitor 21 of the display device 20 (step S101). The sample image to be displayed on the monitor 21 is displayed in the actual size of the object.

When the sample image is displayed on the monitor 21, the imaging control module 42 makes the camera 31 of the imaging device 30 image the monitor 21 (step S102). The image acquired by imaging of the camera 31 is stored in the storage section 45. The image stored in the storage section 45 may be subjected to image processing such as noise removal, correction for brightness of the image, and the like as the need arises. The determination control module 43 makes a good/defective determination of the object indicated by the image acquired by imaging (step S103).

The good/defective determination is made in the same manner as the image inspection of the examination system 100 described above. That is, the good/defective determination of step S103 is made by comparing the image acquired by imaging of the camera 31 and sample image of the object which is a good article with each other. This sample image of the good article and sample image displayed on the monitor 21 are the same image.

For example, the image acquired by imaging of the camera 31 and sample image of the object which is a good article are compared with each other with regard to the items such as the outer shape, color, light/shade, and the like and, when a point deviating from the inspection criterion is detected, the object is determined to be a defective article. When the examination system 100 including the camera 31 and the like is normal, the examination system 100 determines that the object indicated by the image is a good article with respect to the image acquired by imaging the sample image of the good article.

After the determination using the sample image of the good article is made, determination using a sample image of a defective article is made. The display control module 41 displays the sample image of the defective article stored in the storage section 45 on the monitor 21 of the display device 20 (step S104).

The sample image displayed on the monitor 21 is displayed in the actual size of the object. When the sample image is displayed on the monitor 21, the imaging control module 42 makes the camera 31 of the imaging device 30 image the monitor 21 (step S105). The image acquired by imaging is stored in the storage section 45. The image stored in the storage section 45 may be subjected to image processing such as noise removal, correction for brightness of the image, and the like as the need arises. The determination control module 43 makes a good/defective determination of the object indicated by the image acquired by imaging (step S106). The good/defective determination is made, as in the case of step 3103, by comparing the image acquired by imaging of the camera 31 and sample image of the object which is a defective article with each other. This sample image of the defective article and sample image displayed on the monitor 21 are the same image. Step S106 is different from step S103 in that the image to be compared is a sample image of the defective article. When the examination system 100 including the camera 31 and the like is normal, the examination system 100 determines that the object indicated by the image is a defective article with respect to the image acquired by imaging the sample image of the defective article.

After the determination in step S106 is made, the determination control module 43 determines whether or not the examination system 100 is normal (step S107). When it is determined by the examination system 100 that the sample image of the good article is a good article in step S103, and that the sample image of the defective article is a defective article in step S106, the determination control module 43 determines that the examination system 100 is normal. However, when at least one of the good/defective determinations of the examination system 100 that the sample image of the good article is a defective article, and that the sample image of the defective article is a good article is made, the determination control module 43 determines that the examination system 100 is not normal.

Then, the output control module 44 outputs the determination result from the output device 50 (step S108). As the determination results, not only the determination result of step S107 but also the determination results of step S103 and step S106 may be output.

Although in the flowchart shown in FIG. 5, sample images of the good article and defective article are acquired in sequence by imaging and good/defective determinations are thereby made, inspection of the examination system 100 may be carried out by using only one of the sample images. Further, after making a good/defective determination using the sample image of the defective article, good/defective determination using the sample image of the good article may also be made.

Furthermore, the control device 40 may identify devices or the like having abnormalities from the determination result that the examination system 100 is not normal. Information about the devices or the like identified as those having abnormalities may be output from the output device 50. It becomes possible for the worker to take necessary measures on the basis of the information output from the output device 50.

Further, the control device 40 may subject the devices or the like having abnormalities to necessary measures such as calibration or the like from the determination result that the examination system 100 is not normal. For example, when the focal distance of the camera 31 for the monitor 21 is not appropriate, position adjustment is carried out for the monitor 21 and camera 31. Then, after the necessary measures such as calibration and the like are taken, the operations from step 3101 may also be carried out again, and then determination as to whether or not the examination system 100 is normal may also be made.

As described above, carrying out an image inspection by using the sample image displayed on the monitor 21 makes it possible to determine whether or not the examination system 100 is normal. Particularly, in this embodiment, no master sample of the good article or defective article is used, and hence the fear about the chronological change of the master sample is eliminated. Further, by carrying out an inspection by the procedure identical to the image inspection to be carried out in the actual examination system 100, it becomes possible to carry out an inspection of the examination system 100 including the camera 31.

The image displayed on the monitor 21 without, using a master sample of the good article or defective article is acquired by imaging of the camera 31, and hence preparation of a master sample of a good article or defective article and storage of the master sample are made unnecessary. Further, even when there is a plurality of examination systems 100, it is not necessary to prepare the master sample for each of the examination systems 100, and hence it is possible to inspect the plurality of examination systems 100 at a time. When the simultaneous inspection of the plurality of examination systems 100 is enabled, it becomes possible to reduce the man-hours needed to carry out inspection of the examination systems 100 in the daily inspection.

The monitor 21 is placed at the position at which the object is to be arranged, and sample image to be displayed on the monitor 21 has the actual size of the object, and hence it is possible to inspect the examination system 100 without the need for changing the devices constituting the examination system 100 or changing the arrangement of the devices.

A master sample including a conductive paste such as the adhesive AD exemplified in FIG. 4A and FIG. 4B cannot withstand long use due to oxidation of the aforementioned paste in some cases. When an object including a part at which a chronological change occurs becomes the object to be inspected, the inspection method of this embodiment requiring no master sample is particularly effective.

Second Embodiment

Figure 6:
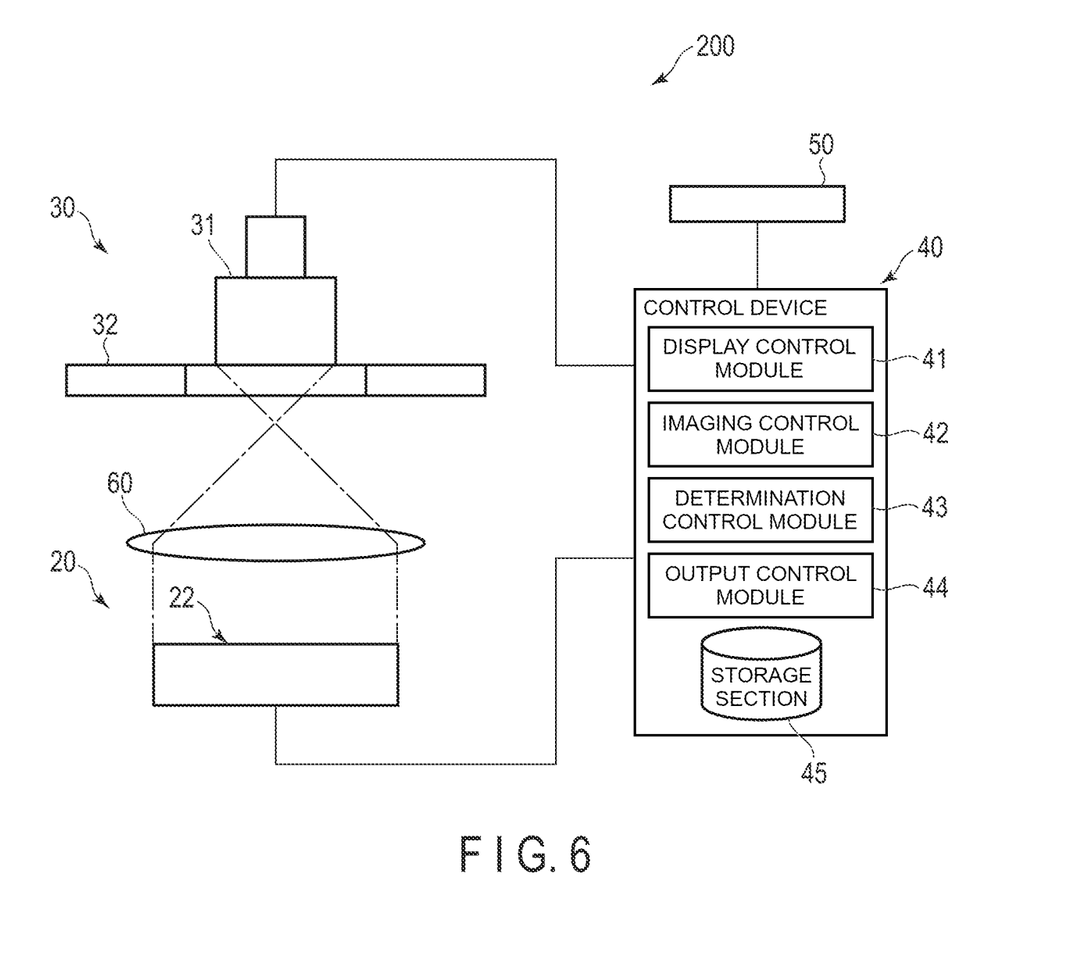
FIG. 6 is a view showing the schematic configuration of an examination system according to a second embodiment.

A second embodiment will be described below. Constituent elements identical to the first embodiment are denoted by reference symbols identical to the first embodiment, and descriptions of the constituent elements are appropriately omitted. FIG. 6 is a view showing the schematic configuration of an examination system 200 according to the second embodiment. In this embodiment, a monitor 22 is larger in size than the monitor 21 of the first embodiment, and reducing lens 60 is arranged between the display device 20 and imaging device 30. The second embodiment is different from the first embodiment in this point.

For example, even when the sample image displayed on the monitor 22 is larger in size than the imaging range of the camera 31, by inserting the reducing lens 60 between the display device 20 and imaging device 30 to thereby reduce the sample image to the actual size of the object, imaging using the camera 31 is enabled. By reducing the sample image displayed on the monitor 22 by means of the reducing lens 60, it becomes possible to acquire the image having a high degree of resolution by imaging of the camera 31. When the image having a high degree of resolution can be acquired, it becomes possible to make a determination with a higher degree of accuracy by means of the control device 40.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An inspection method usable to inspect an examination system configured to image an object and make a good/defective determination of the object based on an image acquired by imaging the object, the examination system comprising a display device configured to display an image, an imaging device including a camera configured to image the object, and a control device configured to control the display device and the imaging device, and the method comprising, under control of the control device:
   displaying a sample image of a good article or a defective article of the object on the display device;
   imaging the displayed sample image by the camera;
   making a good/defective determination of the object included in the sample image based on the image acquired by the imaging by the camera; and
   determining whether or not the examination system is normal.

2. The inspection method of claim 1, wherein the sample image is displayed in an actual size of the object.

3. The inspection method of claim 1, wherein the making the good/defective determination of the object comprises comparing the image acquired by the imaging by the camera and the sample image with each other.

4. The inspection method of claim 3, further comprising, after making the good/defective determination of the object included in the sample image, outputting a result of the good/defective determination.

5. An examination system configured to image an object and make a good/defective determination of the object based on an image acquired by imaging the object, the examination system comprising:
   a display device configured to display an image;
   an imaging device including a camera configured to image the object; and
   a control device configured to control the display device and the imaging device,
   wherein the control device is configured to:
      control the display device to display a sample image of a good article or a defective article of the object;
      control the camera to image the sample image displayed on the display device;
      make a good/defective determination of the object included in the sample image based on the image acquired by the imaging by the camera; and
      determine whether or not the examination system is normal.

6. The examination system of claim 5, wherein the display device displays the sample image in an actual size of the object.

7. The examination system of claim 5, wherein the control device makes the good/defective determination of the object by comparing the image acquired by the imaging by the camera and the sample image with each other.

8. The examination system of claim 7, further comprising an output device configured to output a result of making the good/defective determination of the object included in the sample image.

* * * * *